Sept. 9, 1958     H. W. PARKER     2,851,595

TRANSDUCERS

Filed Dec. 22, 1953     2 Sheets-Sheet 1

INVENTOR.
HENRY W. PARKER
BY Morton Amster
ATTORNEY.

Sept. 9, 1958 H. W. PARKER 2,851,595
TRANSDUCERS
Filed Dec. 22, 1953 2 Sheets-Sheet 2
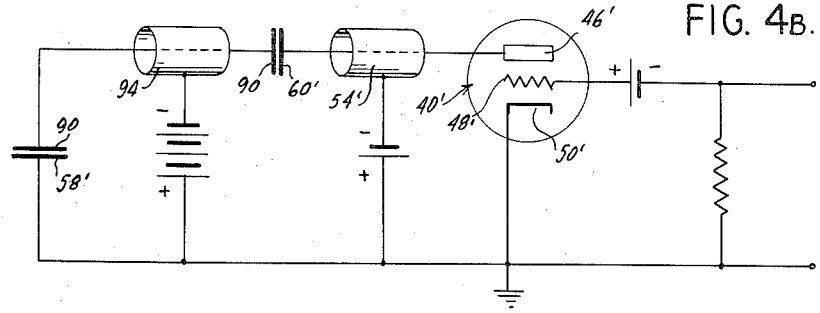
FIG. 4B.
FIG. 4A.
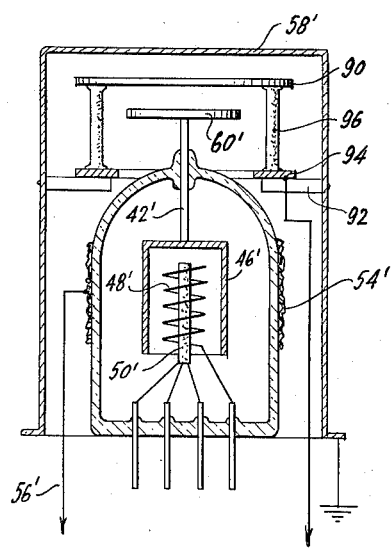
FIG. 5A.
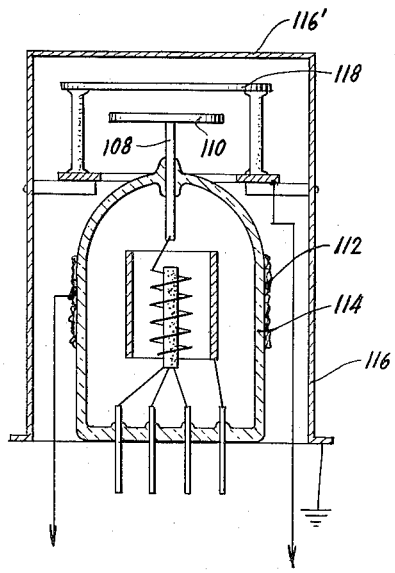
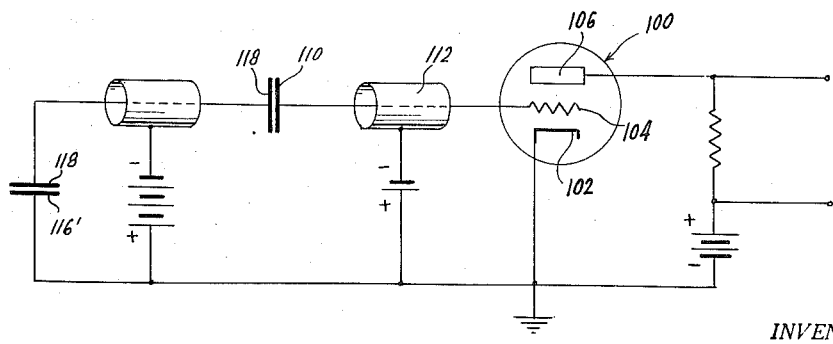
FIG. 5B.
INVENTOR.
HENRY W. PARKER
BY Morton Amster
ATTORNEY.

United States Patent Office 2,851,595
Patented Sept. 9, 1958

2,851,595
TRANSDUCERS

Henry W. Parker, Flushing, N. Y.

Application December 22, 1953, Serial No. 399,670

2 Claims. (Cl. 250—27)

The present invention relates to transducer, broadly to a method and means for converting microscopic displacements into corresponding perceptible electrical variations, and specifically to tubes and circuitry for performing this transducing function.

In detecting displacements of an order smaller than the wave length of visible light, resort has been made to numerous instrumentalities, prominently piezo-electric and velocity-magnetic transducers. For example, piezoelectric crystals, such as tourmaline, have been found to exhibit fair properties for microseismic investigation which requires extremely high sensitivity, especially at frequencies approaching several cycles per second. Among the problems encountered in use of these relatively fragile crystals has been the hydrostatic insensitivity and consequently impairment of low frequencies response by low gauge resistance, even when provided with waterproofed coatings; a high pyroelectric sensitivity bringing about comparatively large and unpredictable changes in sensitivity for relatively small temperature gradients; and the relaxation effect of the crystal being such that the crystals are basically unsuited for static pressure measurements and the required frequency response. The several problems characteristic of crystal transducers suggest the need for a sensitive instrument which is capable of accurately performing the required sensing function, and is free from one or more of the aforesaid difficulties.

Accordingly, it is an object of the present invention to provide an improved method and means for converting microscopic displacements into sensible electrical variations. Specifically, it is within the contemplation of the present invention to provide a motion-electric transducer of extremely high sensitivity, even when aproaching steady state conditions, such as when sensing periodic variations in the vicinity of several cycles per second.

Among the many applications of the present invention, without limitation, are conducting microseismic studies, gauging micropolished finishes, measuring extremely small temperature variations, as well as more general applications including the provision of highly sensitive microphones, hearing aids, phonograph pickups and the like.

Certain objects of the invention are realized by the provision of a displacement transducer including an electrode pair capacitatively coupled together with one electrode insulated such as to hold a substantially constant charge for an interval which is long as compared to the period of the recurrent displacements to be sensed. When the spacing between the electrode pair is varied as a function of the distance to be measured, corresponding incremental, yet sensible, voltage changes are induced on the insulated electrode. These voltage variations are then measured by voltage-responsive indicating means, which in one form of the invention may be calibrated to read directly in units of displacement.

The remarkable properties of the present displacement transducer will be more fully appreciated when it is borne in mind that microscopic displacements may be measured with sensitivities approaching 30 microvolts per Angstrom unit.

The various features and aspects of the present invention including further objects and practical applications will be more fully appreciated upon reference to the following description of several presently preferred embodiments, when taken in conjunction with the accompanying drawings, wherein:

Figs. 1A to 1D inclusive are diagrammatic showings of several means for applying and maintaining a constant charge on an electrode in accordance with the present invention;

Fig. 4A is a diagrammatic showing of a still further tube construction embodying features of the invention;

Fig. 4B is a schematic circuit representation of the tube construction of Fig. 4A;

Fig. 5A is a diagrammatic showing of a still further tube embodying features of the invention; and, Fig. 5B is a schematic circuit representation of the tube construction of Fig. 5A.

Figure 1A:
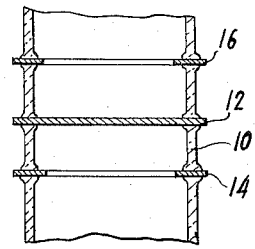

For a more thorough and complete understanding of the scope of the present disclosure, some of the concepts of electrostatic phenomena should be considered. For an area plate capacitor or condenser including space plates capacitatively coupled together, the charge will leak off slowly in accordance with the expression:

Equation 1

$$q = q_0 e^{\frac{-t}{RC}}$$

Where $q_0$ is the initial charge expressed in ampere seconds, R is the insulator resistance in ohms, C is the capacitance in farads, and $t$ is the time in seconds. As a feature of the invention the insulator resistance is made comparatively large, as by well insulating one plate of the capacitor and is continually recharged through the high resistance of the insulator from a polarizing potential, to maintain the charge on the insulated plate relatively constant and equal to the initial charge for a comparatively long interval. In one practical form, a constant charge capacitor may employ a dielectric medium having a dielectric constant approach unity, such as dry air or a good vacuum, and an insulator having a resistivity of the order of $10^{15}$ ohm cm., such as quartz or a vitreous material.

It can be shown analytically and demonstrated experimentally that the electric intensity measured in volts per centimeter is constant for a parallel-plate condenser with one plate insulated and that, as the separation of the plates are changed, as by being increased by mechanical work, the work is stored in the condenser by a corresponding voltage change such that the electric intensity is maintained constant. The foregoing may be expressed in the following equation:

Equation 2

$$\Delta V = \frac{V}{d} \Delta d$$

Where V is the voltage on the isolated plate, $d$ is the initial displacement of the plates of the parallel-plate condenser, and $\Delta V$ is the incremental voltage change brought about by a microscopic displacement of $\Delta d$ Equation 2 states that an increment of voltage is equal to the field intensity measured in volts per centimeter times the displacement in centimeters. It should be appreciated that Equation 2 is based on ideal-parallel-plate theory and for practical purposes is only valid for displacement of the order presently under consideration. As to larger displacements, it is presently thought that shunting stray capacitance would overshadow the active face capacitance to such a degree that, instead of the voltage approaching infinity, it would approach the limiting value determined by the self-capacitance and the stray shunt capacitance. The varying applications of these basic principles will best be appreciated from the following description of presently preferred forms of the invention.

Referring now to Figs. 1A to 1D inclusive, there are shown several constructions for obtaining an isolated electrode or plate which will maintain a substantial constant charge over a required interval, the isolated plate being incorporated into various transducers, subsequently to be described.

For example, in Fig. 1A there is shown a support 10 having an isolated electrode or disc 12 sealed transversely thereof, and symmetrically disposed guard rings 14, 16 arranged on opposite sides of the electrode 12. The guard rings, connected to a source of polarizing or charging potential, apply the constant charge to the electrode 12 through the intermediate high resistance charging path provided by the support, which in one practical form may be the envelope of a conventional tube having a resistivity of the order of $10^{14}$ ohm cm.

Figure 1B:
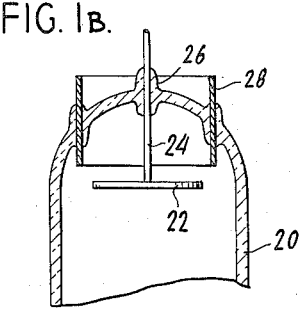

In Fig. 1B there is shown an enclosure 20 of vitreous material or the like supporting a depending isolated plate 22 which is carried on a lead 24 having a glass-to-metal seal 26 with the envelope 20, the lead 24 being arranged concentrically of a circular guard ring 28 which is likewise sealed to the support 20. The high resistance charging path is provided by the portions of the vitreous enclosure intermediate the guard ring and the conductive lead 26.

Figure 1C:
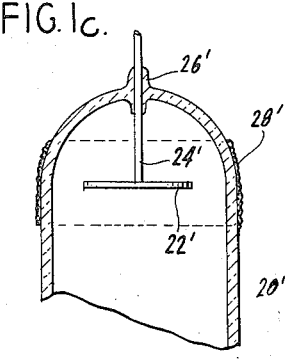

In Fig. 1C there is shown a further arrangement for applying a constant charge to an electrode in which the guard ring 28 is replaced by a conductive band $28^1$ coated on the external surfaces of the glass support $20^1$.

Figure 1D:
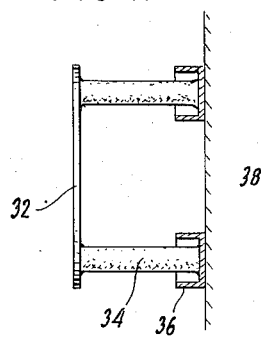

In Fig. 1D the isolated electrode 32 is supported by standoff insulators 34, of glass or other suitable high resistance material, which are seated within guard cups 36 fixed to an appropriate support 38, the guard cups 36 being connected to a suitable source of charging potential.

In the several constructions illustrated in Figs. 1A to 1D inclusive there are shown systems for isolating a plate of a parallel-plate condenser such that a constant charge may be applied to said condenser. As the plates are displaced in accordance with incremental distances to be sensed, the incremental displacements will be manifested, as corresponding incremental potential changes induced on the isolated plate, and magnified by the electrical intensity initially placed upon the insulated plate. Theoretically attainable sensitivity may be appreciated by substitution in Equation 2. For example, for an air dielectric capacitor having one millimeter spacing between plates of indefinite area, with a charge on the insulated plate such that 300 volts exist across the spacing of one millimeter, the electrical field intensity will be 3000 volts per centimeter. Assuming that the incremental displacement is 1000 Angstrom units, corresponding to $10^{-5}$ centimeters, Equation 2 indicates that a volt change of .03 volt may be obtained, which is the remarkable value of 30 microvolts per Angstrom unit of displacement. It must be stressed that this sensitivity is only theoretically attainable and practical considerations, such as stray capacitances, the leakage in insulators, thermal agitation noises in the resistance of the insulators, the ion current of thermionic tubes used as indicators, and other factors will greatly decrease the ideal sensitivity. However, it is to be emphasized that even incomplete utilization of the maximum obtainable sensitivity would result in low frequency sensitivities heretofore unobtainable.

It will be appreciated that in my several constructions for isolating the constant charge electrode, various low insulation paths to the isolated electrode are blocked by the interposition of the guard member overcoming one of the difficulties germane to application and modification of ordinary vacuum tubes as displacement transducers.

Apart from this consideration, the adaptation of a thermionic sensing tube for measuring the voltage changes of the isolated electrode, there is the problem of deleterious ionization at the rated operation of the vacuum tube. This ionization creates a relatively large ion current to the negatively charged isolated electrode, such that a constant charge cannot be maintained on the electrode for an appreciable period. As is well understood, there are two main sources of ion current in the ordinary vacuum tube, one source being the ionization caused by collision of electrons with the residual entrapped gases and the other source being ion emission by the heated cathode.

In accordance with the present invention, as applied either to modifying known tube types or constructing further thermionic devices removal of ionization by collision with the entrapped gases is accomplished by lowering the tube operating potentials below the threshold of ionization. If there exists in the space of the vacuum tube no positive potential as high as the ionizing potential, it can be expected that no electron will have sufficient energy to cause ionization by collision. As a further measure, and to avoid radiations causing the occurrence of an occasional ion, it is advantageous in most instances to operate the vacuum tube with only a few volts positive on the anode. As to the emission of ions from the heated cathode, this can be overcome by reducing the temperature of the cathode, such that the ionization is lowered to an acceptable value. Although a reduction of the operating temperature of the cathode concurrently reduces the emission of electrons, the ion emission is diminished more rapidly as a function of temperature. Accordingly, operating at several hundred degrees centigrade below the rated operating temperatures for a cathode design causes appreciable reductions in ion emission.

In accordance with these several aspects of the invention, a thermionic sensing tube for the displacement transducer would include a cathode operated at a low temperature; electrodes having maximum positive potentials less than the lowest ionizing potential of any residual gas entrapped within the tube; a control electrode having a negative charge which may be large in relation to the small positive value of the operating potential on the output electrode; and appropriate means on all paths leading from the constant-charge control electrode assuring adequate electrical insulation for the maintenance of the required constant charge.

Figure 2B:
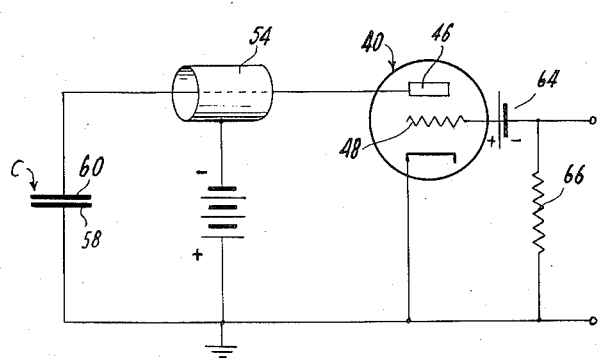
Fig. 2B is a schematic circuit representation of the tube construction shown in Fig. 2A.
Figure 2A:
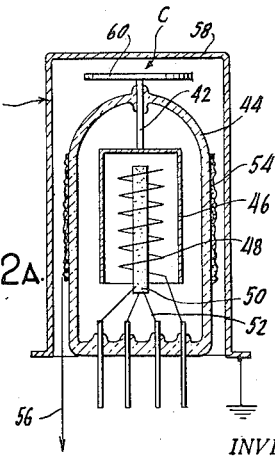
Fig. 2A is a diagrammatic showing of a tube incorporating one form of the displacement transducer of the present invention.

Reference will now be made to Figs. 2A and 2B which shows a simplified form of transducer embodying features of the invention in which the constant-charge capacitor and the indicating vacuum tube are separated from each other. Specifically, a conventional vacuum tube triode 40 is arranged with a self-supported anode lead 42 coming from the top of the tube envelope 44. Sealed within the envelope in accordance with principles well understood per se are the anode electrode 46, a control grid 48, and an indirectly heated cathode 50 having an appropriate heater 52. Coated on the external surfaces of the envelope 44 substantially coextensive with the anode electrode 46 is a concentric guard ring 54 connected by an appropriate lead or terminal 56 to a source of polarizing potential. The sensing capacitor C, which is responsive to the minute displacement to be observed and measured, includes a movable plate or diaphragm 58 capacitatively coupled to a relatively stationary plate 60 on the anode-supported lead 42. In the illustrative form, the diaphragm 58 is part of an enclosure 62 which surrounds and shields the tube, the enclosure 62 being provided with a suitable ground connection. Referring to the circuit of Fig. 2B it will be seen that the conventional grid 48 of the vacuum tube serves as an output electrode and is maintained at the required small positive potential by an appropriate biasing battery 64, a load resistance 66 being arranged to feed any conventional amplifier. In providing operating potentials for the indicator tube 40, the amplification factor must be considered. A negative polarizing potential is placed on the fixed plate 60 of the sensing capacitor and on the anode 46 of the tube and the grid 48 is always at a small positive potential in relation to the cathode 50. It is in this sense that the positively charged grid 48 serves as the output electrode and the negatively charged anode or plate 46 serves as the control electrode, the conventional triode functioning as an "inverted amplifier." Operation of the "inverted amplifier" is with a lowered cathode temperature, and since there is no large positive potential present in the tube relative to the cathode the problem of ionization is appreciably reduced.

Although the modification of the standard tube described in conjunction with Figs. 2A and 2B have utility, it is to be appreciated that this approach does not permit ideal utilization although readily demonstrating certain fundamentals and principles of the invention. The reduction of sensitivity due to inverse amplification presents difficulty and is inconsistent with the requirement of a large electrical field in the constant charge capacitor. In an attempt to reduce loss of sensitivity due to inverse amplification, resort to low amplification vacuum tubes appears to be desirable. However, this requires a smaller negative charge on the isolated plate of the capacitor which is antagonistic with the basic premise that the greater the polarizing potential, the greater the incremental change in dependence upon the sensed displacement.

Figure 3:
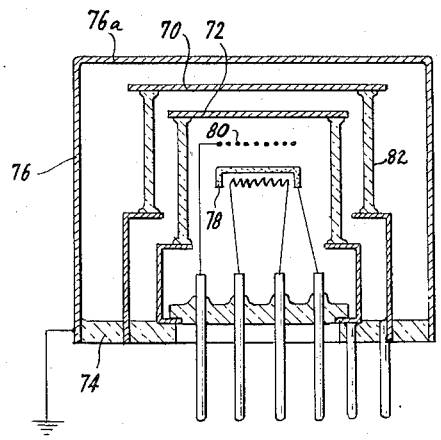
Fig. 3 is a diagrammatic showing of a further tube embodying a modified displacement transducer incorporating further features of the present invention.

Therefore, in accordance with further aspects of the invention, and by reference to Fig. 3 there is shown modified circuitry for the separation of the two functions of polarizing and biasing to in part utilize a greater portion of the theoretical sensitivity of the transducer. In Fig. 3, two constant-charge electrodes 70, 72 are capacitatively coupled together, the electrode 70 having the relatively large negative polarizing potential, and the electrode 72 having the relatively small negative biasing potential. The remaining components of the tube are similar in all material respects to a low amplification planar cathode tube which includes a stem 74 having appropriate leads for pins sealed therethrough, a grounded envelope or casing 76 having a flexible diaphragm portion 76A serving as the movable electrode of the sensing capaitor, an indirectly heated cathode 78, and a controlled grid 80 interposed between the cathode and the constant-charge biasing electrode 72. Appropriate supports serving as charging paths, are provided for the respective electrodes 70, 72, each including an insulator section 82 as of glass or other high resistance material. In this arrangement, the action of capacitatively coupled constant-charge electrodes 70, 72 is similar to a capacitor voltage divider. The presence of a small negative biasing on the constant-charge electrode 72 adjacent the grid 80, serving as the output electrode ,prevents electron current to the control electrode, the low negative potential on the control electrode allowing for use of a low amplification factor and more perfect utilization of the theoretical sensitivity.

In Figs. 4A and 4B there is shown a tube construction similar to the structure illustrated in Figs. 2A and 2B, except for the addition of a capacitor voltage divider. Intermediate the movable constant charged electrode 58[1] and the fixed constant-charged electrode 60[1], there is interposed a further constant-charge electrode 90 which is supported on an auxiliary support 92 by provision of guard rings or cups 94 and appropriate insulators and spacers 96. The approach to mounting of the constant charge electrode 90 is similar to that illustrated in Fig. 1D of the drawing; but any one of the other illustrative constructions may be found equally well suited. In the modification of Figs. 4A and 4B, the interposed constant-charge electrode 90 is provided with the large negative polarizing potential, while the constant-charged electrode 60' is provided with the smaller negative biasing potential to realize a more perfect utilization of sensitivity in the plate signal injection system of Figs. 2A, 2B, and 4A and 4B.

In lieu of the plate injection for the signal which is a function of the displacement to be sensed, the use of the capacitance voltage divider in the several described transducers permits conventional utilization of the vacuum tube, that is by grid injection of signal. The operating conditions for the tube are again such that the cathode must be maintained at a temperature sufficiently low to avoid troublesome ionization, and the positive potential employed within the tube must be lower than the lowest ionizing potential of any trapped residual gases. These operating conditions impose the necessity of very close spacing of the grid-cathode and the anode-grid distance to obtain appreciable transconductance in the electrical characteristics of the tube at low voltage operation. Further, in utilizing grid injection of the signal, it is necessary to construct the tube such that the various electrodes are rigidly mounted in relation to each other to avoid random motion and the introduction of spurious signals.

Reference will now be made to Figs. 5A and 5B wherein there is shown a vacuum tube of the triode type 100 including an indirectly heated cathode 102, a control grid 104 carried by a lead 108, and a plate 106. In this embodiment, a constant-charge plate 110 is fixed to the grid-supporting lead 108 and isolated from a guard ring 112 on the envelope 114, the charge being applied to the plate 110 via the intermediate high resistance section of the envelope 114. Surrounding the vacuum tube is a grounded enclosure 116 having a diaphragm portion 116A. Interposed between the diaphragm portion 116A and the grid-supported electrode 110 is a further constant-charge electrode 118 supported in an appropriate manner, such as illustrated in Fig. 1D. The operation of this grid injection vacuum tube indicator with the external capacitative voltage divider should be well understood from the foregoing description. The constant charge displacement transducer can be a unitary structure, such as illustrated in Fig. 3 or can be separated into two component parts, namely the sensing circuitry and the indicating vacuum tube, as shown in Figs. 4 and 5.

What I claim is:

1. A vacuum tube comprising a sealed envelope, a cathode, a control electrode, and an output electrode interposed between said cathode and control electrode, means for isolating said control electrode including a high resistance path for applying and maintaining a constant charge on said control electrode, means for maintaining said output electrode at a positive potential relative to said cathode, and a movable electrode separated from said control electrode by a uniform dielectric medium.

2. A transducer for converting microscopic displacements into sensible electrical variations comprising a vacuum-sealed envelope including a control electrode, an output electrode and a cathode, a first stationary electrode external to said envelope and electrically connected to said control electrode, means electrically isolating said first stationary electrode and providing a high resistance charge path for application of a constant charge on said first stationary electrode, a sensing electrode capacitatively coupled to said first stationary electrode, said sensing electrode being external to said envelope and being movable relative to said first stationary electrode in dependence upon incremental displacements to be transduced to correlated incremental voltage charges on said control electrode, a second stationary electrode intermediate said first electrode and said sensing electrode, and means electrically isolating said second stationary electrode and providing a high resistance charge path for application of a constant charge on said second stationary electrode.

References Cited in the file of this patent

UNITED STATES PATENTS

| | | |
|---|---|---|
| 1,887,739 | Mott | Nov. 15, 1932 |
| 2,025,461 | Leonard | Dec. 24, 1935 |
| 2,027,399 | Ostermeier | Jan. 14, 1936 |
| 2,089,677 | Von Kramolin | Aug. 10, 1937 |
| 2,399,213 | Edwards | Apr. 30, 1946 |